United States Patent
Gross et al.

(10) Patent No.: US 7,192,146 B2
(45) Date of Patent: Mar. 20, 2007

(54) SOLAR CONCENTRATOR ARRAY WITH GROUPED ADJUSTABLE ELEMENTS

(75) Inventors: William Gross, Pasadena, CA (US); Gregg Luconi, Pasadena, CA (US); Denes Zsolnay, Rolling Hills Estates, CA (US)

(73) Assignee: Energy Innovations, Inc., Pasadena, CA (US)

( * ) Notice: Subject to any disclaimer, the term of this patent is extended or adjusted under 35 U.S.C. 154(b) by 0 days.

(21) Appl. No.: 10/900,966

(22) Filed: Jul. 28, 2004

(65) Prior Publication Data

US 2005/0034752 A1     Feb. 17, 2005

Related U.S. Application Data

(60) Provisional application No. 60/516,025, filed on Oct. 31, 2003, provisional application No. 60/490,746, filed on Jul. 28, 2003.

(51) Int. Cl.
*G02B 5/10* (2006.01)

(52) U.S. Cl. ...................... 359/853; 359/872

(58) Field of Classification Search ........... 126/699, 126/700, 683, 684, 685, 686, 687, 688, 689, 126/690, 691, 692, 695, 696; 136/206, 246; 359/850–855, 846, 849, 877
See application file for complete search history.

(56) References Cited

U.S. PATENT DOCUMENTS

| | | | |
|---|---|---|---|
| 1,386,781 A * | 8/1921 | Harvey | ........................ 126/604 |
| 3,905,352 A * | 9/1975 | Jahn | ............................ 126/578 |
| 4,035,065 A | 7/1977 | Fletcher et al. | |
| 4,056,313 A | 11/1977 | Arbogast | |
| 4,098,264 A | 7/1978 | Brokaw | |
| 4,103,673 A | 8/1978 | Woodworth et al. | |
| 4,149,902 A | 4/1979 | Mauer et al. | |
| 4,159,710 A * | 7/1979 | Prast | ........................... 126/582 |
| 4,168,696 A | 9/1979 | Kelly | |
| 4,172,443 A | 10/1979 | Sommer | |
| 4,191,164 A | 3/1980 | Kelly | |
| 4,227,939 A | 10/1980 | Zewail et al. | |
| 4,243,018 A * | 1/1981 | Hubbard | ..................... 126/576 |
| 4,256,088 A | 3/1981 | Vindum | |
| 4,267,824 A | 5/1981 | O'Halloran | |
| 4,295,463 A | 10/1981 | Citron | |

(Continued)

OTHER PUBLICATIONS

"U.S. Appl. No. 10/888,079, filed Jul. 9, 2004".

*Primary Examiner*—Mark A. Robinson
*Assistant Examiner*—Scott Stephens
(74) *Attorney, Agent, or Firm*—Andrew S. Naglestad; Knobbe Martens Olson & Bear LLP

(57) ABSTRACT

A ground-based tracking heliostat array comprises a first plurality of elongate row mounts. The elongate row mounts are positioned at least partially between, and are supported by, a first side bracket and a second side bracket. The row mounts are rotatable in a first axis. The array further comprises a plurality of optical elements that are mounted to one or more of the elongate row mounts. The array further comprises a linkage that is mechanically coupled to a first plurality of elongate row mounts. Movement of the linkage causes the first plurality of elongate row mounts to simultaneously rotate in the first axis. The array further comprises a motor configured to move the linkage.

41 Claims, 11 Drawing Sheets

U.S. PATENT DOCUMENTS

| | | | |
|---|---|---|---|
| 4,297,521 A * | 10/1981 | Johnson | 136/248 |
| 4,333,446 A | 6/1982 | Smyth | |
| 4,365,618 A * | 12/1982 | Jones | 126/576 |
| 4,408,595 A | 10/1983 | Broyles et al. | |
| 4,424,802 A | 1/1984 | Winders | |
| 4,491,388 A | 1/1985 | Wood | |
| 4,561,425 A * | 12/1985 | Long et al. | 126/681 |
| 4,566,432 A * | 1/1986 | Sobczak et al. | 126/606 |
| 4,602,613 A * | 7/1986 | Barr | 126/600 |
| 4,800,868 A | 1/1989 | Appeldorn et al. | |
| 4,968,355 A * | 11/1990 | Johnson | 136/246 |
| 4,999,059 A * | 3/1991 | Bagno Robert G. | 136/248 |
| 5,203,318 A | 4/1993 | Chauvet | |
| 5,255,666 A | 10/1993 | Curchod | |
| 5,325,844 A * | 7/1994 | Rogers et al. | 126/605 |
| 5,347,986 A | 9/1994 | Cordy | |
| 5,395,070 A | 3/1995 | Stirbl et al. | |
| 5,529,054 A | 6/1996 | Shoen | |
| 5,542,409 A | 8/1996 | Sampayo | |
| 5,640,950 A | 6/1997 | Cordy, Jr. | |
| 5,758,938 A | 6/1998 | Osterwisch | |
| 5,787,878 A | 8/1998 | Ratliff, Jr. | |
| 5,862,799 A | 1/1999 | Yogev et al. | |
| 5,958,761 A | 9/1999 | Yogev et al. | |
| 5,977,478 A | 11/1999 | Hibino | |
| 6,020,554 A | 2/2000 | Kaminar et al. | |
| 6,080,927 A | 6/2000 | Johnson | |
| 6,134,784 A | 10/2000 | Carrie et al. | |
| 6,276,359 B1 | 8/2001 | Frazier | |
| 6,286,504 B1 * | 9/2001 | Suginobu | 126/577 |
| 6,349,718 B1 * | 2/2002 | Ven et al. | 126/685 |
| 6,442,937 B1 | 9/2002 | Stone et al. | |
| 6,688,303 B2 | 2/2004 | Davenport et al. | |
| 6,700,055 B2 | 3/2004 | Barone | |
| 6,704,607 B2 | 3/2004 | Stone et al. | |
| 6,820,611 B2 * | 11/2004 | Kinoshita | 126/576 |
| 6,953,038 B1 | 10/2005 | Nohrig | 126/694 |
| 6,959,993 B2 * | 11/2005 | Gross et al. | 359/853 |
| 6,971,756 B2 * | 12/2005 | Vasylyev et al. | 359/852 |

* cited by examiner

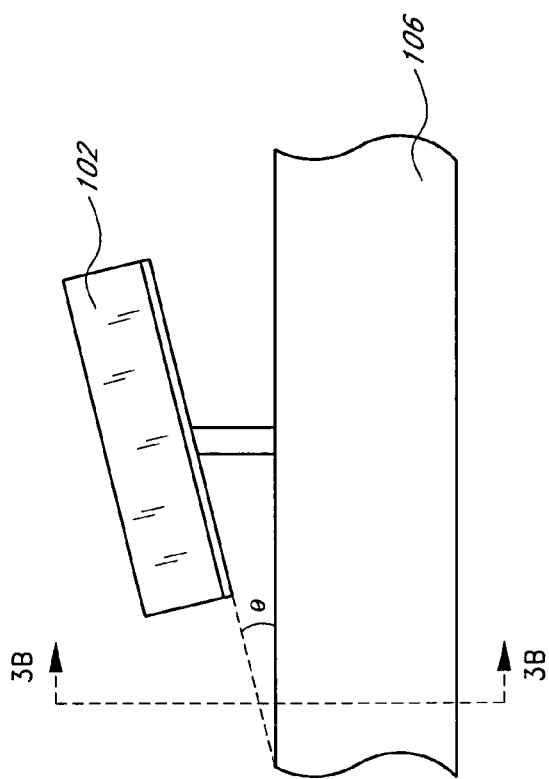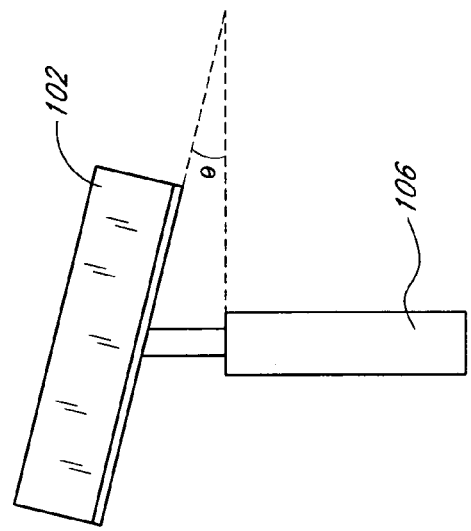

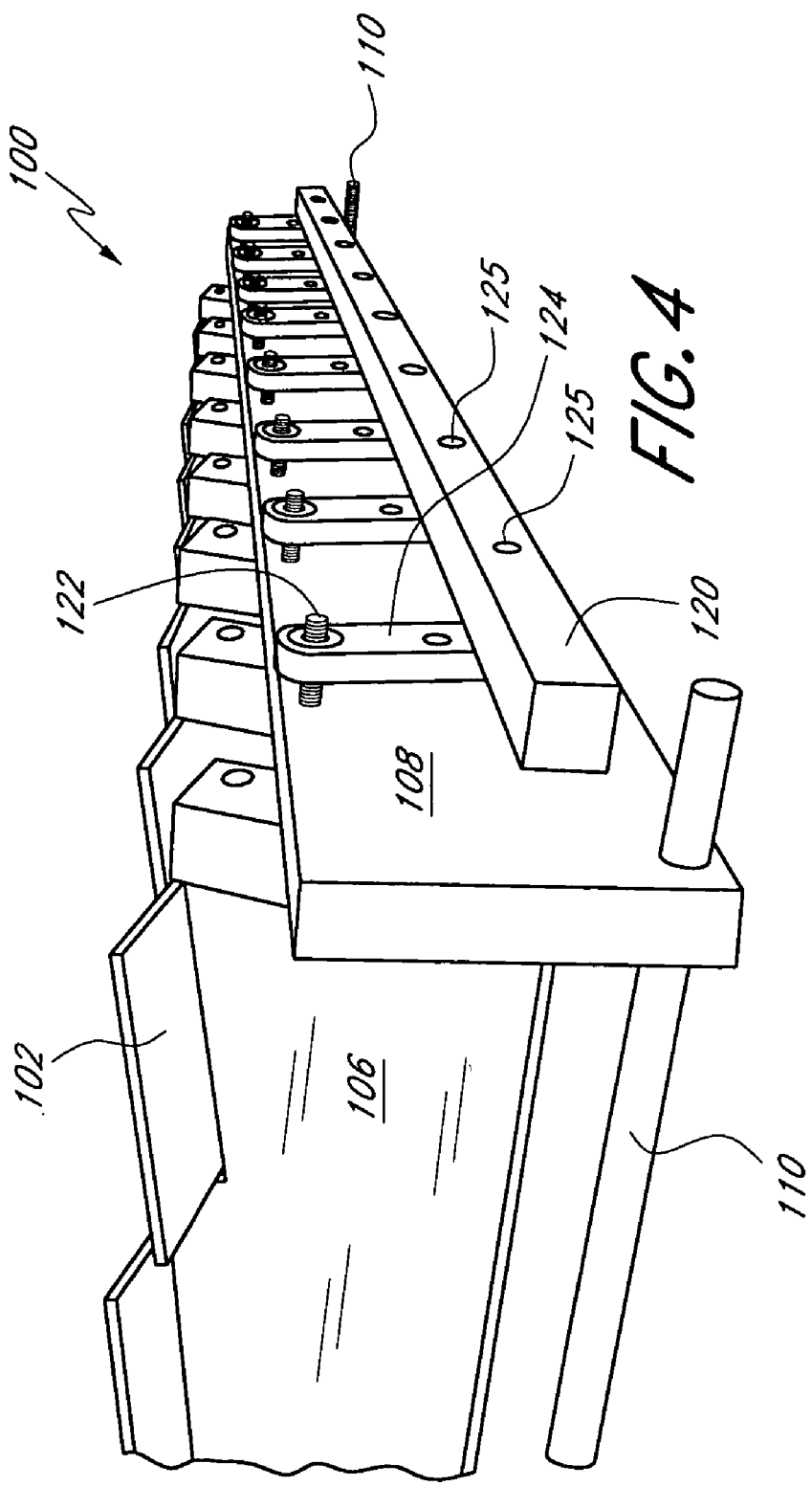

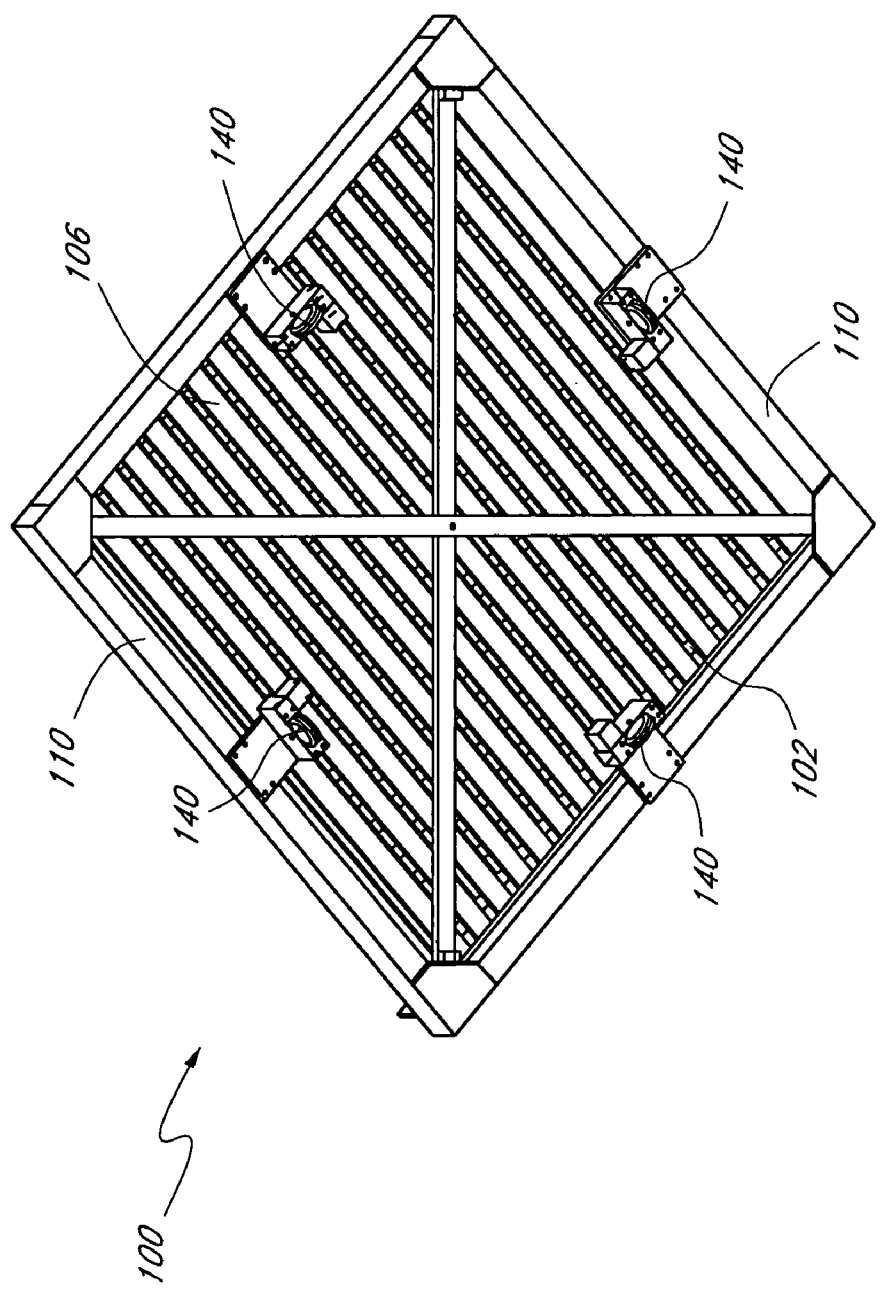

SOLAR CONCENTRATOR ARRAY WITH GROUPED ADJUSTABLE ELEMENTS

PRIORITY APPLICATIONS

This application claims the benefit of U.S. Provisional Patent Application 60/490,746 (filed 28 Jul. 2003) and U.S. Provisional Patent Application 60/516,025 (filed 31 Oct. 2003). The entire disclosure of both of these priority applications is hereby incorporated by reference herein.

FIELD OF THE INVENTION

The present invention relates generally to solar concentrators, and more specifically to an array of solar concentrators capable of tracking movement of the sun.

BACKGROUND OF THE INVENTION

Many solar concentrators comprise a single optical element, such as a single lens, mirror, or reflector. Examples of such concentrators include dish and trough concentrators. Other solar concentrators comprise an array of optical elements that are individually adjustable to track the position of the sun in the sky. One type of arrayed concentrator is the "heliostat array". In a heliostat array, a field of reflective optical elements concentrates solar energy on a collector having dimensions that are small compared to the dimensions of the array. The orientation of the optical elements in a heliostat array can be individually adjustable, thereby allowing the focal point of the array to remain on the collector over the course of a day and during different seasons. Such an arrangement is often referred to as a "tracking" heliostat array.

In a conventional tracking heliostat array, configuring each optical element to be individually movable typically requires a large amount of expensive motorized equipment. For example, in one conventional configuration, two motors are used to adjust the orientation of each element in the tracking heliostat array. Thus, using this configuration, a tracking heliostat array comprising a 10×10 array of mirrors uses 200 motors to adjust the orientation of the mirrors. In addition to causing the array to be undesirably expensive, this large amount of motorized equipment results in an array that is relatively heavy, which is particularly disadvantageous for applications where weight is a significant factor, such as for rooftop mounted applications.

SUMMARY OF THE INVENTION

An improved tracking heliostat array has been developed. In an exemplary embodiment, as few as one motor can be used to simultaneously adjust the orientation of all optical elements in the array. This configuration allows the number of motors required for the entire tracking heliostat array to be reduced as compared to many conventional heliostat arrays. By reducing the number of motors, one embodiment advantageously reduces the cost, complexity and weight of the array as compared to a conventional tracking heliostat array having dedicated motors associated with each optical element. Therefore, such an array is well-suited for use in decentralized small-scale applications and/or weight sensitive applications, such as individual rooftop mounted residential systems. However, such an array can also be used in large-scale, ground based applications.

In one embodiment of the present invention a ground-based tracking heliostat array comprises a first plurality of elongate row mounts. The elongate row mounts are positioned at least partially between, and are supported by, a first side bracket and a second side bracket. The row mounts are rotatable in a first axis. The array further comprises a plurality of optical elements that are mounted to one or more of the elongate row mounts. The array further comprises a linkage that is mechanically coupled to a first plurality of elongate row mounts. Movement of the linkage causes the first plurality of elongate row mounts to simultaneously rotate in the first axis. The array further comprises a motor configured to move the linkage.

In another embodiment of the present invention, a concentrator apparatus comprises a plurality of spaced apart optical elements positionable to concentrate light. The apparatus further comprises a support frame. At least one of the optical elements has an adjustable orientation with respect to the support frame. The apparatus further comprises an elongate row mount supporting a subgroup of the optical elements. The subgroup of optical elements has a fixed orientation with respect to the elongate row mount. The apparatus further comprises a motor configured to rotate the elongate row mount. There are fewer motors than optical elements.

In another embodiment of the present invention, a method of concentrating solar radiation on a collector using a plurality of reflectors comprises using a motor to move a linkage. By moving the linkage, a first subgroup of the plurality of reflectors is rotated around a first axis. By moving the linkage, a second subgroup of the plurality of reflectors is simultaneously rotated around a second axis. The second axis is parallel to the first axis. The first subgroup of reflectors is fixedly mounted to a first rotating elongate row mount. The second group of reflectors is fixedly mounted to a second rotating elongate row mount.

In another embodiment of the present invention, a method of concentrating optical energy onto a collector comprises rotating a first elongate row mount around a first axis using a motor. The first elongate row mount has mounted thereto a first plurality of optical elements. The first plurality optical elements have a fixed orientation with respect to the first elongate row mount. The method further comprises rotating a second elongate row mount around a second axis substantially parallel to the first axis using the same motor used to rotate the first elongate row mount around the first axis. The second elongate row mount having mounted thereto a second plurality of optical elements. The method further comprises receiving optical energy reflected from the first and second pluralities of optical elements at a collector.

In another embodiment of the present invention, a concentrator system comprises a first plurality of optical elements tiltable with respect to an array plane via a manipulation linkage. The system further comprises a second plurality of optical elements tiltable with respect to the array plane via the manipulation linkage. The system further comprises a motor configured to actuate the manipulation linkage, thereby allowing the first and second pluralities of optical elements to be simultaneously reoriented. The system further comprises a collector positioned to receive solar energy reflected from the first and second pluralities of optical elements. The system further. comprises control circuitry configured to operate the motor to increase a quantity of solar energy received by the collector.

In another embodiment of the present invention, a solar energy concentrator system comprises a first row of reflective elements mounted to a first structure. The first row of reflective elements is pivotable about a first axis. The system further comprises a second row of reflective elements mounted to the first structure. The second row of reflective elements is pivotable about a second axis. The first axis is parallel to the second axis. The system further comprises a linkage coupled to the first and second row of reflective elements. The system further comprises a collector positioned above the first row and the second row of reflective elements. The system further comprises a first motor coupled to the linkage. The first motor is configured to move the linkage so as to cause the first row and the second row of reflective elements to rotate at the same time correspondingly about the first axis and the second axis. The system further comprises a second motor coupled to the first structure to rotate the first structure about a third axis. The third axis is perpendicular to the first axis.

In another embodiment of the present invention, a solar energy concentrator system comprises a mounting structure. The system further comprises a first row of reflective elements rotatable in a first axis. The first row of reflective elements is coupled to the mounting structure. The system further comprises a second row of reflective elements rotatable in a second axis parallel to the first axis. The first row of reflective elements is coupled to the mounting structure. The system further comprises a motor coupled to the mounting structure. The motor is configured to rotate the mounting structure in a third axis perpendicular to the first axis.

In another embodiment of the present invention, a solar energy concentrator system comprises a mounting structure. The system further comprises a first row of reflective elements pivotable about a first axis. The first row of reflective elements is coupled to the mounting structure. The reflective elements comprising the first row have a fixed orientation with respect to each other. The system further comprises a second row of reflective elements pivotable about a second axis parallel to the first axis. The second row of reflective elements is coupled to the mounting structure. The system further comprises a motor coupled to the first and second rows of reflective elements. The system further comprises a controller coupled to the actuator. The controller is configured to cause the motor to pivot the first and second rows of reflective elements at the same time.

BRIEF DESCRIPTION OF THE DRAWINGS

Exemplary embodiments of an improved tracking heliostat array are illustrated in the accompanying drawings, which are for illustrative purposes only. The drawings comprise the following figures, in which like numerals indicate like parts.

FIG. 3A is a side view of a selected optical element mounted to an elongate row mount.

FIG. 3B is an end view of the selected optical element of FIG. 3A taken along line 3B—3B.

FIG. 4 is a perspective view of an exemplary tracking heliostat array having a row manipulation linkage capable of reorienting the optical elements.

FIG. 9 is a perspective view of the underside of the tracking heliostat array of FIG. 1.

DETAILED DESCRIPTION OF PREFERRED EMBODIMENTS

Figure 1:
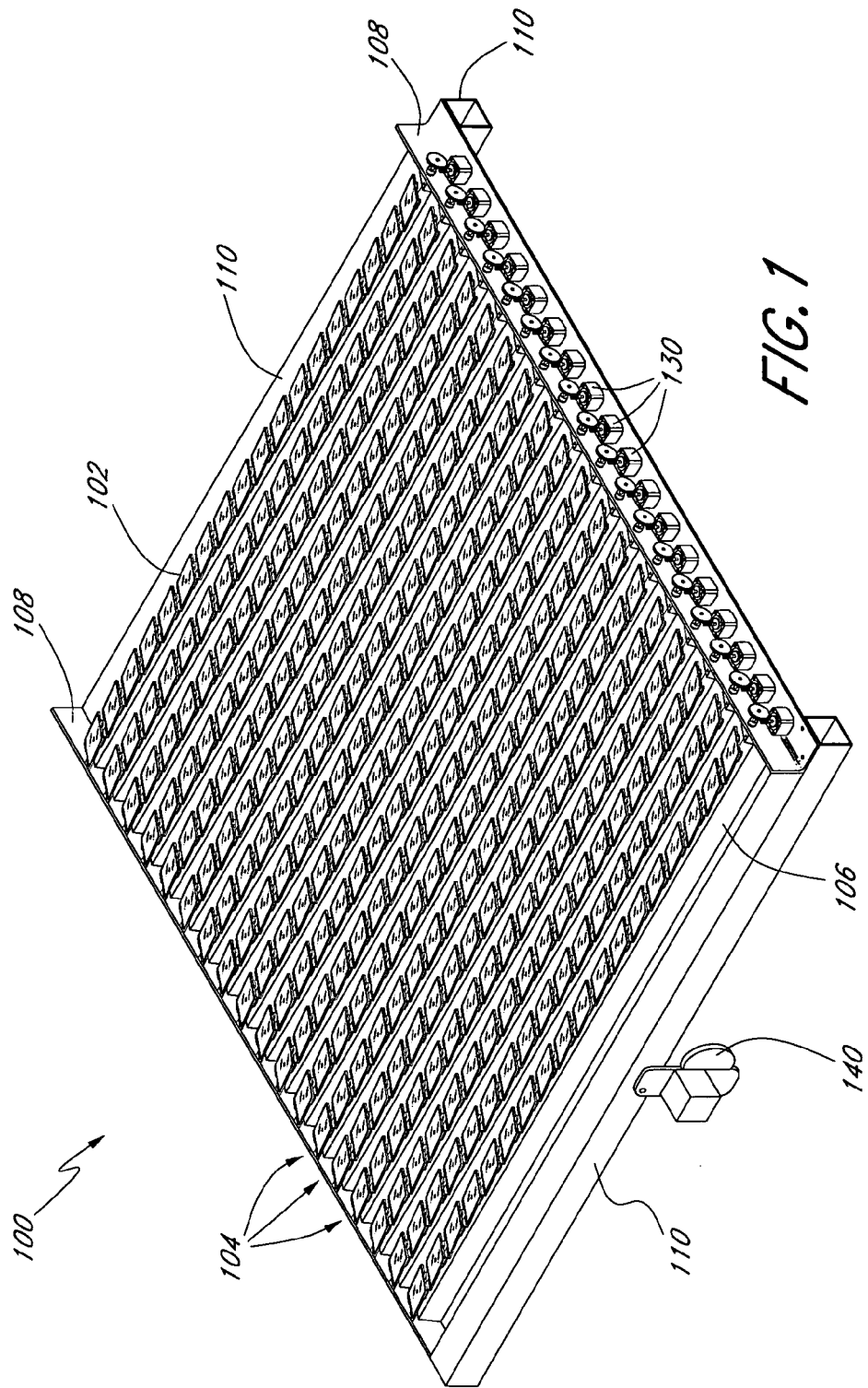
FIG. 1 is a perspective view of an exemplary tracking heliostat array with grouped adjustable optical elements.

As described herein, an improved tracking heliostat or solar concentrator array having adjustable optical elements has been developed. By using one or more motors to adjust the orientation of group of optical elements, fewer overall motors are required as compared to a conventional array having dedicated motors associated with each optical element. Additionally, the motors used to adjust the orientation of optical elements often require environmental protection, and therefore conventional tracking heliostat arrays having motors associated with each optical element often are placed within a protective enclosure. This can adversely affect the solar concentrator by reducing the amount of solar energy that is reflected from the optical elements, and by increasing the weight and cost of the array.

Therefore, by using one or more motors to adjust the orientation of more than one optical element, several advantages can optionally be obtained. For example, the improved tracking heliostat array configurations disclosed herein can be less expensive, more reliable, more efficient, and lighter than many conventional tracking heliostat arrays. Certain embodiments of the tracking heliostat arrays disclosed herein have a modular configuration that is easily manipulated, lifted and mounted on a rooftop without the need for specialized labor or equipment. Additionally, certain embodiments have a low profile even when deployed, thereby further facilitating rooftop use by providing a low wind resistance.

Heliostat arrays reflect solar energy from the sun or other light source onto a collector or receiver, where it is generally converted to another form of energy. The solar energy is reflected by "optical elements," which can include planar mirrors, concave mirrors, lenses, reflectors, other devices capable of reflecting or focusing light, and/or a combination of the foregoing. The optical elements are optionally enclosed within a clear cover, such as a plastic cover, to protect the array from environmental damage or dirt. As used herein, the "collector" refers generally to a device configured to receive solar energy reflected from the heliostat array and to convert the received solar energy to another form of energy.

Certain collectors, such as photovoltaic cells and Stirling engines combined with a generator, convert the received solar energy into electric energy, which can be in the form of a voltage potential with an associated available current. Other collectors convert the received solar energy into other forms of energy, such as thermal energy and/or mechanical energy. For example, a Stirling engine can be included in the collector. The Stirling engine converts thermal energy or a temperature differential, such as that resulting from focused solar energy, to movement. An example Stirling engine can include a displacer piston that moves enclosed air back and forth between cold and hot reservoirs. A regenerator, which can be in the form of a wire mesh or the displacer piston itself, is optionally positioned between the hot and cold reservoirs. In the hot reservoir the air expands and pushes a power piston, producing work and displacing the air to the cold reservoir. The air contracts in the cold reservoir, thereby "pulling" the power piston. If a regenerator is used, then as the air cycles between the hot and cold reservoirs, the heat is transferred to and from the regenerator. By way of further example, a frying pan can be used to convert solar energy received from a heliostat array into thermal energy, which can then be used to cook food that is placed in the frying pan.

An exemplary heliostat array is illustrated in FIG. 1. This heliostat array 100 includes 324 optical elements 102 arranged in an 18×18 square array. In other embodiments, more or fewer optical elements can be used, and the optical elements can be configured in arrays with other shapes, such as circles, ovals, rectangles, lines, or other irregular shapes. As illustrated, in the example the optical elements 102 are arrayed in a plurality of rows 104. Each row 104 comprises one or more optical elements 102 which are mounted to a rigid elongate row mount 106. In an exemplary embodiment, the elongate row mount 106 comprises an injection molded plastic structure, which allows the row mount 106 to be manufactured at a relatively low cast and to be relatively lightweight. Other support structures, such as aluminum, fiberglass or wood, can be used in other embodiments. The optical elements 102 are mounted to the elongate row mount 106 using a suitable fastening technique, such as with an adhesive, brackets, tape, screws or bolts.

Figure 2:
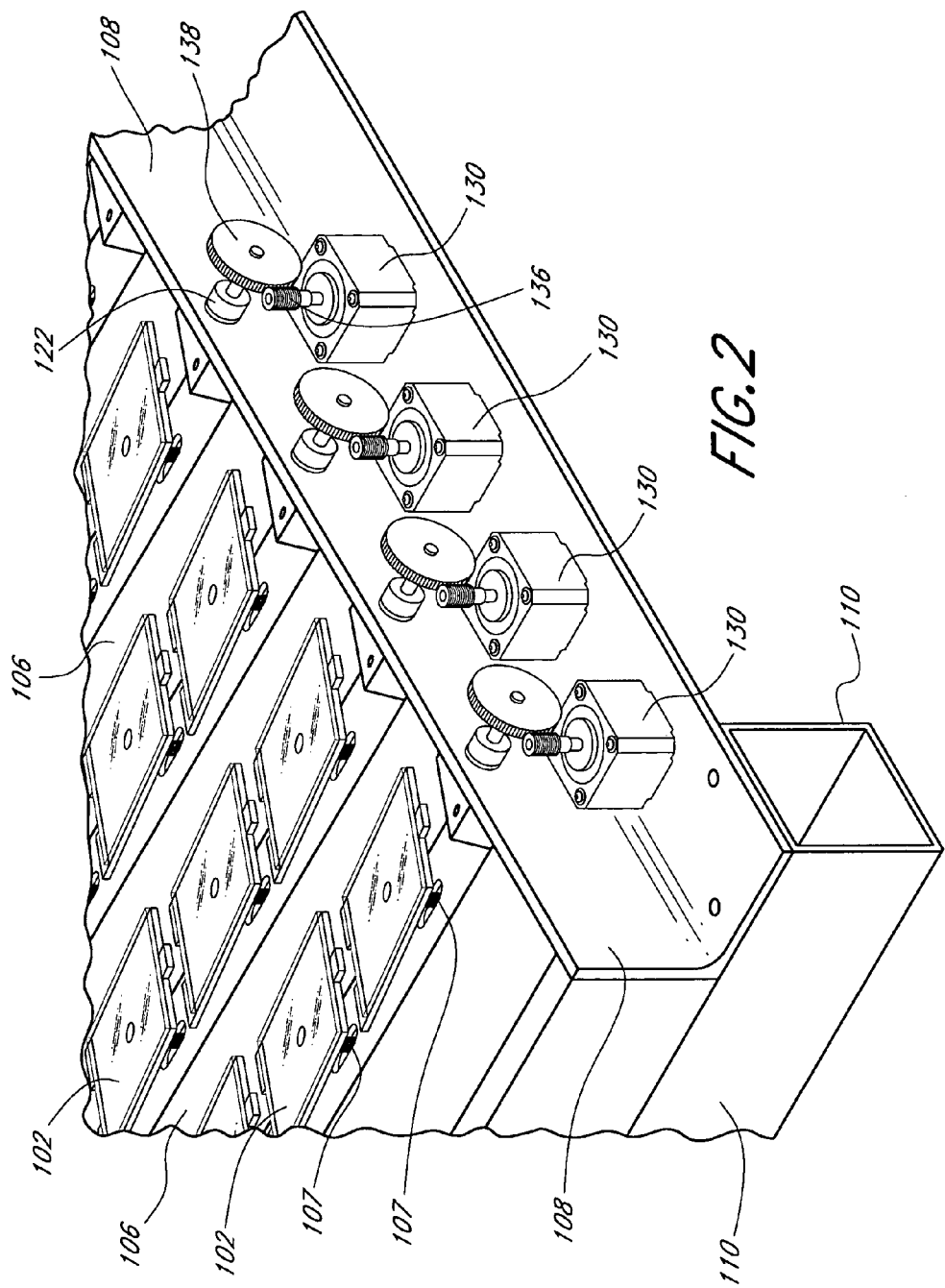
FIG. 2 is a close-up view of one corner of the exemplary tracking heliostat array of FIG. 1.

In the exemplary embodiment illustrated in FIG. 1, the optical elements 102 are 3-inch square planar mirrors, although other optical elements having other shapes, such as rectangles or ovals, can be used in other embodiments. Likewise, smaller or larger optical elements, as well as non-planar mirrors, can be used in other embodiments. In an exemplary embodiment, the optical elements are mounted at a convenient height from the mounting surface (for example, the roof or the ground), such as a height greater than one inch relative to the mounting surface. A close-up view of one corner of the example heliostat array 100 is provided in FIG. 2. This view illustrates that the optical elements 102 are mounted to the elongate row mounts 106 using posts 107.

Figure 10A:
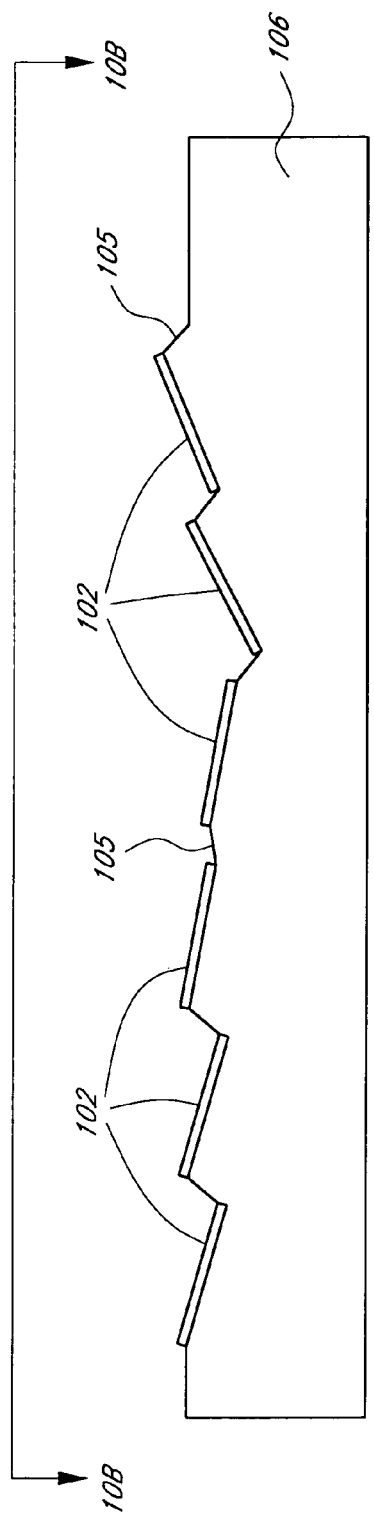
FIG. 10A is an elevation view of an exemplary elongate row mount having a zigzag surface.
Figure 10B:
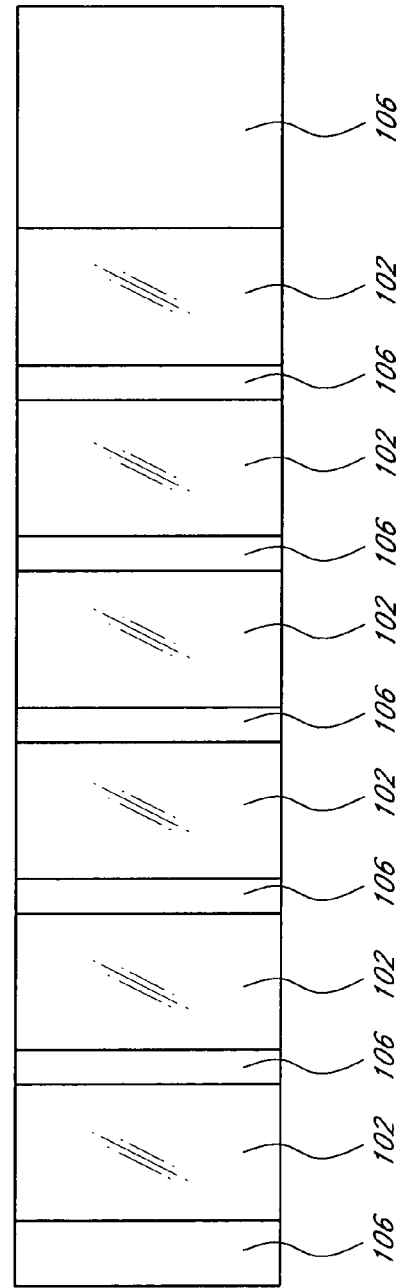
FIG. 10B is a top-down view of the elongate row mount of FIG. 10A taken along line 110B—10B.

An alternative exemplary configuration for mounting the optical elements 102 to the elongate row mounts 106 is illustrated in FIGS. 10A and 10B. In this embodiment, as illustrated in FIG. 10A, the elongate row mount 106 has a zigzag surface 105 to which the optical elements 102 can be affixed. The optical elements 102 can be mounted using a suitable fastening technique, such as with an adhesive, brackets, tape, screws or bolts. A top-down view of the exemplary elongate row mount 106 is provided in FIG. 10B. By providing a more stable mount, his exemplary embodiment advantageously reduces the likelihood that the optical elements 102 will inadvertently move into an unintended orientation.

The optical elements 102 are mounted to the elongate row mount 106 at an angle configured to increase the amount of solar energy that can be reflected to a collector mounted over the heliostat array 100. As illustrated in FIGS. 3A and 3B, a selected optical element 102 can optionally be tilted along at least two axes with respect to the elongate row mount 106 to which the optical element 102 is mounted. A first axis of tilt θ, illustrated in FIG. 3A, is parallel to the elongate row mount 106. A second axis of tilt ω, illustrated in FIG. 3B, is perpendicular to the elongate row mount 106. In such embodiments, wherein the collector is mounted approximately over the central region of the array, the optical elements 102 positioned near the periphery of the array are mounted to the elongate row mounts 106 at steeper angles, whereas the optical elements 102 positioned near the center of the array are mounted at shallower angles, or are mounted flat, with respect to the elongate row mounts 106. In an exemplary embodiment, the angles of the optical elements 102 are configured to reflect light from the individual optical elements toward the concentrator.

TABLE 1 provides values of the angle ω for tilt perpendicular to the elongate row mounts 106 for exemplary 8×8 and 10×10 heliostat arrays. Specifically, an 8×8 heliostat array will use the angles listed for rows 1 through 8, while a 10×10 heliostat array will use the angles listed for row mounts 1 through 10. Arrays of other sizes can be used in other embodiments, and the mounting angles can be adjusted accordingly to increase the amount of optical energy reflected to the collector. Negative values indicate that the optical element is tilted in the opposite direction from that illustrated in FIG. 3B.

TABLE 1

| | row | | | | | | | | | |
|---|---|---|---|---|---|---|---|---|---|---|
| | 1 | 2 | 3 | 4 | 5 | 6 | 7 | 8 | 9 | 10 |
| φ (degrees) | −7.6 | −5.1 | −2.5 | 0.0 | 2.5 | 4.8 | 7.0 | 9.1 | 11.0 | 12.8 |

Referring again to FIGS. 1 and 2, the elongate row mounts 106 extend between two parallel side brackets 108. In an exemplary embodiment, the side brackets 108 comprise a rigid support structure, such as a metal or an injection molded plastic structure. The elongate row mounts 106 are rotatable with respect to the stationary side brackets 108. For example, in one embodiment the elongate row mounts 106 rotate around axis 122 with respect to the side brackets 108 using bearing joints or other rotatable joint mechanisms. Optionally, one or more fixed support bars 110 also extend between the two parallel side brackets 108 to increase the overall stability of the heliostat array 100 and/or for mounting additional hardware thereto, such as wheels 140, as discussed in greater detail below.

Thus, rotating one of the elongate row mounts 106 around axis 122 causes the optical elements 102 mounted thereto to rotate. In this configuration, the optical elements 102 mounted to a selected elongate row mount 106 constitute a group of optical elements, such that all of the optical elements in the group rotate together.

Using the foregoing configuration, it is possible to use a single motor to rotate optical elements in one or more groups. For example, in the exemplary embodiment illustrated in FIGS. 1 and 2, each elongate row mount 106 has associated therewith a motor 130 configured to rotate the elongate row mount 106 around axis 122. Therefore, in this particular embodiment, a single motor 130 can be used to rotate eighteen optical elements. In the example embodiment illustrated in FIG. 2, the motor 130 includes a worm screw 136 that mates with a gear 138. When the motor 130 is caused to rotate in a first direction, the worm screw 136 causes the gear 138 to rotate clockwise, which in turn causes the associated row mount 106 to rotate clockwise. Similarly, when the motor 130 is caused to rotate in a second direction, the worm screw 136 causes the gear 138 to rotate counterclockwise, which in turn causes the associated row mount 106 to rotate counterclockwise.

In a modified embodiment, one or more of the elongate row mounts 106 is fixed with respect to the side brackets 108, such that motors are not provided for the fixed rows. Optionally, the motors can be driven with the same drive signal, such that the rows move simultaneously. In still other embodiments, the motors are grouped into two or more groups, such that a first group of mirrors is driven by a first drive signal, and a second group of mirrors is driven by a second drive signal.

In another embodiment, the elongate row mounts 106 can be individually rotated using a number of motors that is less than the number of elongate row mounts 106. In one such example embodiment, the heliostat array 100 includes a linear track along which one or more motors can move. To adjust a particular elongate row mount 106, a motor is moved along the linear track and positioned adjacent to the elongate row mount 106 to be adjusted.

Figure 5:
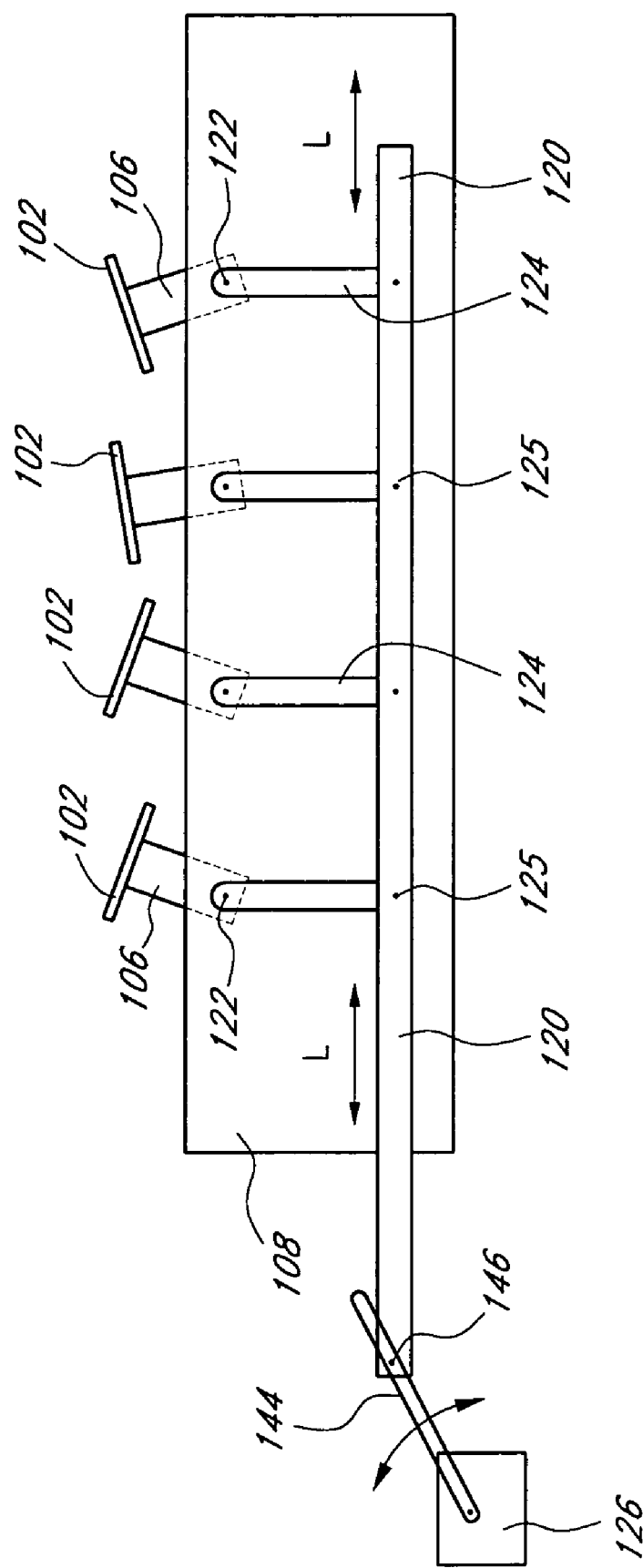
FIG. 5 is a side view of an exemplary tracking heliostat array having a row manipulation linkage capable of reorienting the optical elements.

In the embodiment illustrated in FIGS. 4 and 5, the axis 122 of a plurality of elongate row mounts 106 is linked to a row manipulation linkage 120 using links 124. The links 124 are rotatable with respect to the row manipulation linkage 120, for example using pins 125. In the exemplary embodiment illustrated in FIG. 5, the links 124 are the same length; in a modified embodiment, the links 124 are not the same length, and the row manipulation linkage 120 is not linear, but has a curvature configured to accommodate the various-sized links 124. This enables the elongate row mounts 106, and the mirrors thereon, to move different amounts as desired to better focus the reflected light on the collector.

Referring again to the exemplary embodiment illustrated in FIG. 5, lateral movement of the row manipulation linkage 120, indicated by arrows L in FIG. 5, causes rotation of each elongate row mount 106 mounted thereto. Thus, movement of the row manipulation linkage 120 causes a plurality of elongate row mounts 106 to rotate, thereby causing the optical elements 102 mounted thereto to rotate. Thus, similar to the embodiment illustrated in FIGS. 1 and 2, this embodiment allows a single motor coupled to the row manipulation linkage 120 to rotate several optical elements.

Still referring to FIG. 5, the motor 126 is configured to rotate a connecting rod 144. The linkage 120 is coupled to, and slidable along, the rotatable connecting rod 144 via pin 146. Using this configuration, the row manipulation linkage 120 can move in two dimensions when the motor 126 rotates the connecting rod 144. In such embodiments, movement of the row manipulation linkage 120 is defined by the motion of the links 124. Motor 126 is illustrated in FIG. 5, but is omitted from FIG. 4 for clarity. Optionally, one or more of the elongate row mounts 106 is fixed with respect to the side brackets 108, and is therefore not coupled to the row manipulation linkage 120.

In the exemplary embodiment illustrated in FIGS. 4 and 5, the row manipulation linkage 120 comprises a rigid bar linked to a plurality of elongate row mounts 106 via a plurality of links 124. However, in other embodiments, the row manipulation linkage 120 can comprise other mechanisms to simultaneously rotate a plurality of the elongate row mounts 106, such as a single geared linkage, a drive belt linkage, or a parallelogram linkage. The row manipulation linkage 120 and links 124 comprise a rigid structural material, such as injection molded plastic, metal, wood, or other similar materials.

In still other embodiments, the heliostat array includes more than one row manipulation linkage, wherein each row manipulation linkage is optionally coupled to a corresponding motor. In such embodiments, a first group of elongate row mounts are adjustable using a first row manipulation linkage, a second group of elongate row mounts are adjustable using a second row manipulation linkage, and so forth. The first and second row manipulation linkages are optionally placed on opposite sides of the heliostat array from each other.

Using the embodiments described herein, the orientation of a relatively large number of optical elements can be adjusted using a relatively small number of motors 126/130, thereby reducing the expense and increasing the simplicity of the tracking heliostat array 100. Specifically, unlike conventional tracking heliostat arrays, these embodiments do not require a dedicated motor or motors to adjust each optical element.

In one embodiment, the motors 126/130 are controlled by a controller programmed to reorient the optical elements 102 over the course of a day to increase the amount of solar energy reflected onto a collector mounted over the heliostat array. For example, the controller optionally includes a feedback circuit having an analog-to-digital converter with an analog input coupled to a current sensor, and a digital output. The feedback circuit is configured to monitor the current produced by the collector, and to adjust the orientation of the optical elements 102 using the motors 126/130 to increase or maximize the current produced by the collector. In a modified embodiment, an optical sensor is positioned near or on the collector, and is used to sense the amount of solar energy impinging thereon. The controller can then monitor the optical sensor and/or the current sensor in deciding how to position or angle the optical elements 102. A schematic illustration of selected components of this exemplary control system is provided in FIG. 6.

Figure 7A:
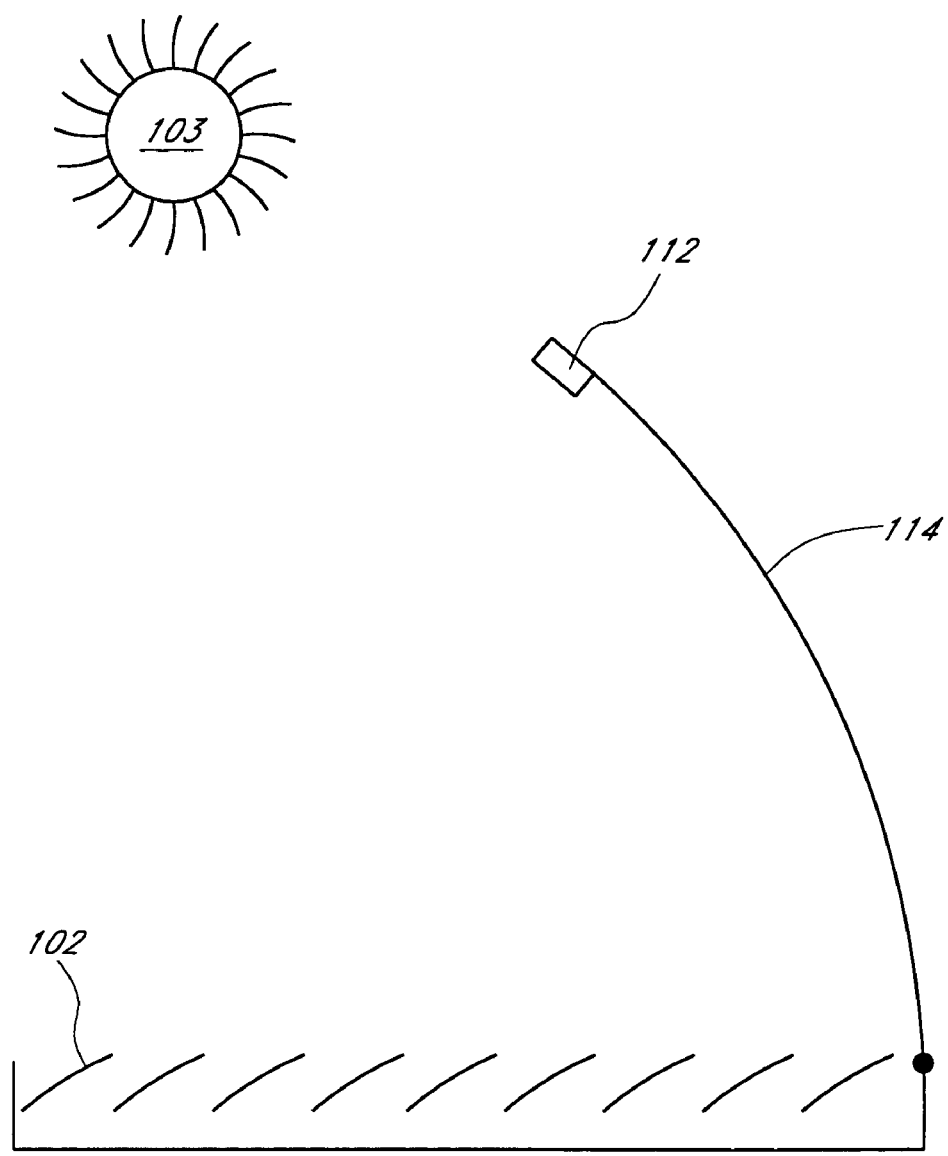
FIG. 7A is a schematic illustration of a tracking heliostat array during a first time period.
Figure 7B:
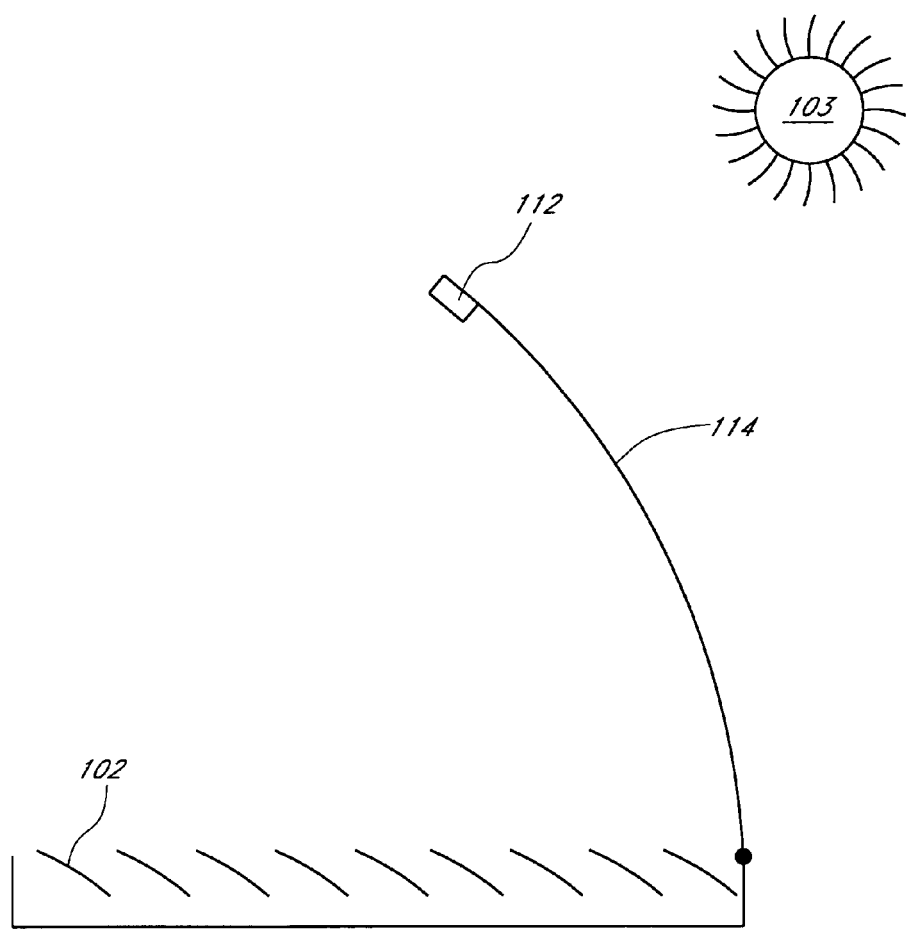
FIG. 7B is a schematic illustration of the tracking heliostat array of FIG. 7A during a second time period that is after the first time period.

As the sun moves across the sky, the orientation of the optical elements can be adjusted to increase the amount of solar energy reflected onto a collector mounted over the heliostat array. A schematic illustration of the movement of the optical elements is provided in FIGS. 7A and 7B. Specifically, FIGS. 7A and 7B illustrate the reorientation of the optical elements 102 to track movement of the sun 103 across the sky. In an exemplary embodiment, the optical elements 102 are automatically incrementally reoriented by the controller such that they continue to reflect sunlight onto a collector 112 as the sun 103 moves across the sky. The optical elements 102 can be continuously reoriented as needed, or can be periodically reoriented as needed, such as every 30 seconds, every 5 minutes, every 15 minutes or every hour during daylight. Support arm 114 supports the collector 112 over the heliostat array.

Figure 8:
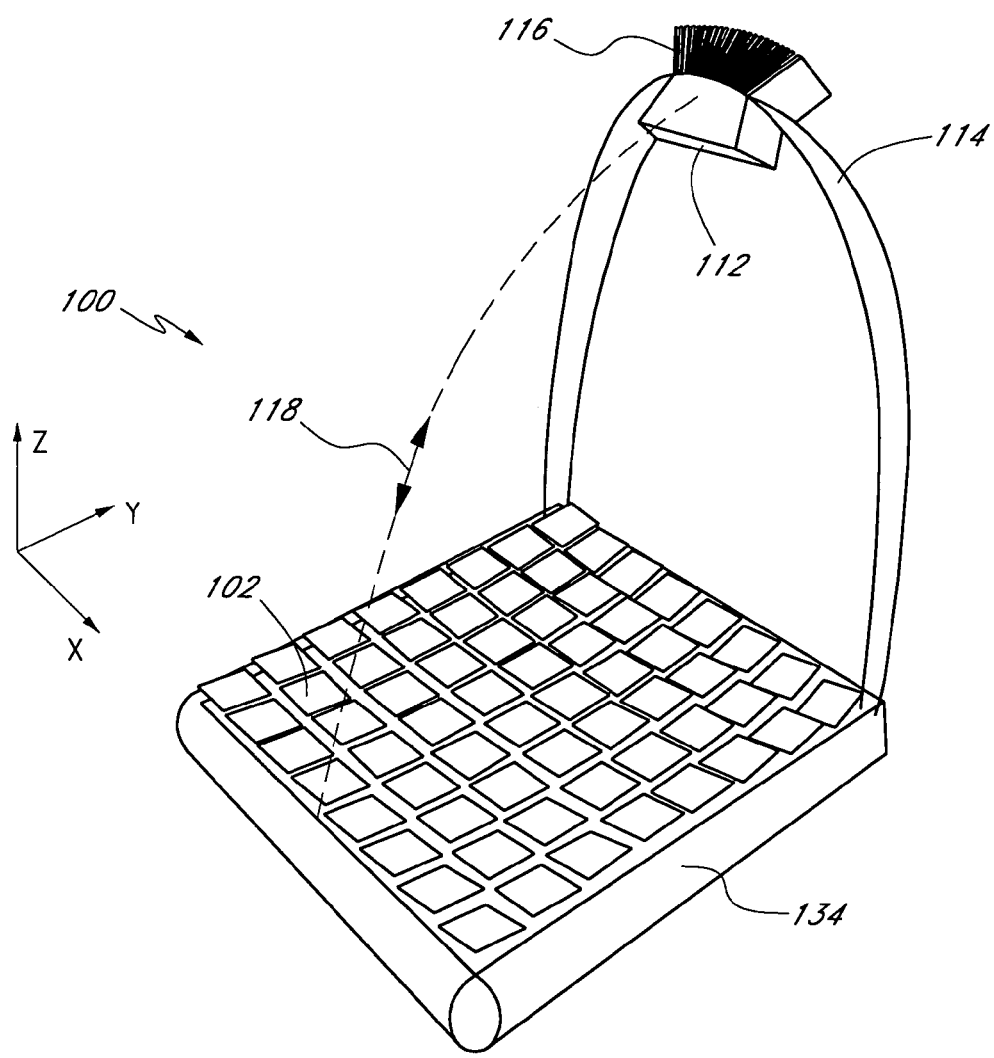
FIG. 8 is a perspective view of an exemplary heliostat array having a protective cover disposed over the motors, and having a collector mounted on a support arm.

Among other optional advantages, the heliostat array configurations disclosed herein allow the motors 126/130 to be positioned away from the optical elements 102 and optionally enclosed within a protective cover. This eliminates the need to enclose the entire heliostat array within a protective cover, and thereby improves the efficiency, while lowering the cost and weight of the heliostat array. For example, FIG. 8 illustrates a heliostat array 100 having a protective cover 134 enclosing the motors. As illustrated, this configuration allows the mirrors 102 to remain uncovered, thus increasing the amount of solar energy that can be reflected from the array. At the same time, this configuration protects the motors coupled to the row mounts from potential environmental damage.

The heliostat array 100 illustrated in FIG. 8 also includes a collector 112 mounted on a support arm 114. In an exemplary embodiment, the collector 112 comprises a photovoltaic cell, although other types of collectors can be used in other embodiments. To facilitate the removal of thermal energy from the collector 112 (for example, to avoid damage to the collector from overheating), a heat sink 116 or other heat dissipation element, such as a thermoelectric or fluid cooler, is mounted to the support arm 114 adjacent to the collector 112. In an exemplary embodiment, the collector 112 is positioned approximately 39 inches above the optical elements 102, although other heights for the collector, both greater than and lesser than 39 inches, such as 20 inches, 34 inches, 44 inches, and 100 inches can be used in other embodiments.

The support arm 114 is optionally pivotable with respect to the heliostat array 100. This can be accomplished, for example, by providing a hinged mount to the side brackets 108. In this configuration, the support arm 114 is movable along path 118, thereby allowing the user to adjust the amount of solar energy that can be reflected to the collector 112. The position of the collector 112 can be adjusted based on the geographical location and orientation of the heliostat array 100, as well as based on variations in the position of the sun in the sky due to seasonal changes.

Figure 6:
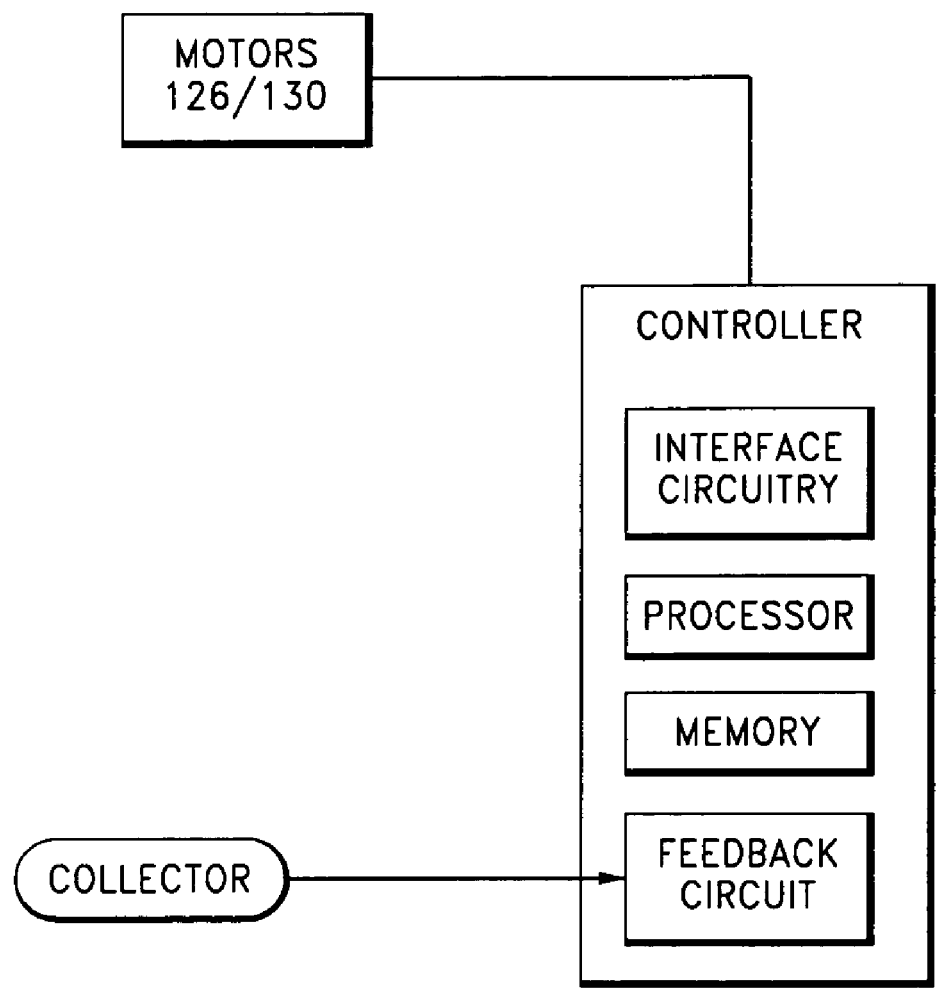
FIG. 6 is a schematic illustration of selected components of an exemplary system for controlling a tracking heliostat array.

In one embodiment, movement of the support arm 114 is controlled by a motor that is optionally controlled by a control system such as the one illustrated in FIG. 6. As described herein, an exemplary control system includes a feedback circuit having an analog-to-digital converter with an analog input coupled to a current sensor, and/or an optical sensor, and a digital output. In such embodiment, the feedback circuit is configured to monitor the current produced by the collector and/or the light received by the optical sensor, and to adjust the motor controlling movement of the support arm 114, thereby causing the support arm 114 to move to a position that increases or maximizes the amount of solar energy incident on the collector. The support arm 114 angle can also be adjusted based on the calendar or other date. In an exemplary embodiment, the support arm 114 is mounted closest to the elongate row mount 106 having the least inclined optical elements 102 (that is, the lowest-numbered row mount as shown in TABLE 1, above).

Certain of the configurations described herein provide the further advantage of allowing the collector to be configured with a smaller target or active area without a comparable reduction in the amount of solar energy that can be collected. Specifically, by more accurately focusing the solar energy reflected from the optical elements on the active area of the collector, the collector can be made smaller. This is particularly advantageous since photovoltaic cells and the like are relatively expensive compared to the other components of a heliostat array.

In an exemplary embodiment, the optical elements 102 are reoriented over the course of a day in order to track the sun, whereas seasonal tracking is performed by gradually moving the collector 112 over the course of the year.

The heliostat arrays disclosed herein are optionally rotatable. In an exemplary rotatable heliostat array, the optical elements are rotatable around at least two axes. For example, in the exemplary embodiment illustrated in FIG. 8, the optical elements 102 are rotatable around the x-axis by rotating the elongate row mounts 106, and are rotatable around the z-axis by rotating the heliostat array 100. In certain embodiments the support arm 114 is configured to rotate with the optical elements 102; in other embodiments the support arm 114 is stationary with respect to the optical elements 102.

For example, the heliostat array 100 illustrated in FIG. 1 includes wheels 140, thus allowing the entire heliostat array 100 to be rotated in a plane generally parallel to the array of optical elements 102. The side of the heliostat array 100 opposite the optical elements 102, also referred to as the underside of the array, is illustrated in FIG. 9. As illustrated, providing the heliostat array 100 with two sets of orthogonal wheels 140 allows the heliostat array 100 to be rotated when placed on a relatively flat, smooth surface.

Although the exemplary embodiment illustrated in FIG. 9 includes one wheel 140 positioned on each of four sides of the heliostat array 100, other quantities of wheels can be positioned in different locations on the heliostat array 100. More than four or less than four wheels can be secured to the heliostat array 100. The wheels can be manufactured from a variety of materials, such as rubber, plastic or metal. In certain embodiments, rotational movement of the heliostat array is controlled manually; in other embodiments, rotational movement of the heliostat array is controlled using an automated feedback system such as that described herein and illustrated in FIG. 6.

In one embodiment, the heliostat array 100 is configured to rotate on a circular track. In a modified embodiment, the heliostat array 100 is floated on a fluid surface, such as in a water reservoir, thus facilitating its rotation. In still other embodiments, the heliostat array 100 is configured to rotate over a wheeled undercarriage supporting the heliostat array 100. Other configurations for rotating the heliostat array 100 can be used in other embodiments. For example, in one configuration, the heliostat array 100 is directly mounted on a motorized turntable or via a spindle to a motor.

Regardless of the technique used to rotate the heliostat array, the amount of solar energy reflected onto the collector 112 can be controlled by rotating the heliostat array 100. In one embodiment, the collector arm 114 is fixed with respect to the array side brackets 108; in an alternative embodiment, the collector arm 114 is mounted stationary with respect to the rotatable array 100. These configurations allow the collector 112 to rotate with the heliostat array or to be stationary with respect to the heliostat array 100.

In certain embodiments, the collector 112 includes a tracking system with a position sensitive detector ("PSD"), which can include one or more optoelectronic sensors. For example, the PSD can include a four quadrant sensor, wherein the amount of light falling within a given quadrant will vary with the relative position of the sun to the PSD. By way of example, the PSD can be a Wallmark type of PSD with four dot electrodes, one on each of the four sides of the PSD. In such embodiments, an optional lens in the collector focuses an image of the sun on the PSD. Using electrical currents generated by the PSD, a processor can calculate coordinates corresponding to the location of the solar image on the PSD. Rotating the solar concentrator array will result in movement of the solar image on the PSD. In particular, the position of the solar image on the PSD depends on the angular location of the sun relative to the solar concentrator array.

Similarly, the amount of electrical current generated by the heliostat array partially depends on the angular location of the sun relative to the array. Thus, in embodiments wherein the collector 112 includes a PSD, there is a "preferred region" on the PSD where the array will generate an increased or maximum amount of electrical current when the solar image is within that "preferred region".

As described herein, in an exemplary embodiment, the heliostat array includes a processor capable of both determining the location of the solar image on the PSD and controlling the rotation of the array. Using a feedback system, the processor is configured to incrementally rotate the array such that the solar image is within the "preferred region". The rotation can be gradually adjusted over the course of a day and/or a year to maintain the solar image within the "preferred region" to the extent possible. Using this technique, the heliostat array can be configured to increase or maximize the amount of electrical current generated given the angular location of the sun relative to the array.

SCOPE OF THE INVENTION

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than solar energy collection.

We claim:

1. A tracking heliostat array comprising:
a first plurality of elongate row mounts positioned at least partially between, and supported by, a first side bracket and a second side bracket, wherein the row mounts are rotatable in a first axis;
a plurality of optical elements that are mounted to one or more of the elongate row mounts;
a linkage that is mechanically coupled to a first plurality of elongate row mounts, such that movement of the linkage causes the first plurality of elongate row mounts to simultaneously rotate in the first axis; and
a motor configured to move the linkage; and
a collector positioned to receive solar energy reflected from at least one of the optical elements, wherein the collector is movable with respect to the first and second side brackets and the collector is configured to pivot downward to a position above the plurality of optical elements.

2. The tracking heliostat array of claim 1, wherein the first and second side brackets are mounted to a wheeled chassis that is configured to be rotatable in a second axis perpendicular to the first axis.

3. The tracking heliostat array of claim 1, further comprising a support bar connecting the first and second side brackets.

4. The tracking heliostat array of claim 1, wherein the linkage is positioned adjacent to the first side bracket.

5. The tracking heliostat array of claim 1, further comprising a protective cover over the linkage and motor.

6. The tracking heliostat array of claim 1, further comprising a computer readable memory that stores the orientation of the plurality of optical elements.

7. The tracking heliostat array of claim 1, wherein the plurality of optical elements is arranged in a rectangular array having a plurality of rows and columns.

8. The tracking heliostat array of claim 1, wherein the orientation of at least one optical element is fixed with respect to the first and second side brackets.

9. The tracking heliostat array of claim 1, further comprising a collector positioned to receive solar energy reflected from at least one of the optical elements.

10. The tracking heliostat array of claim 1, further comprising a collector positioned to receive solar energy reflected from at least one of the optical elements, wherein the collector is a photovoltaic cell.

11. The tracking heliostat array of claim 1, further comprising control circuitry configured to operate the motor to increase a quantity of solar energy reflected from the plurality of optical elements to a collector.

12. The tracking heliostat array of claim 1, further comprising control circuitry configured to operate the motor to increase a quantity of solar energy reflected from the plurality of optical elements to a solar cell.

13. The tracking heliostat array of claim 1, wherein at least one of the optical elements is a mirror.

14. The tracking heliostat array of claim 1, wherein at least one of the optical elements is a planar mirror.

15. The tracking heliostat array of claim 1, wherein at least one of the optical elements is a reflector.

16. The tracking heliostat array of claim 1, further comprising a transparent cover positioned over the plurality of optical elements.

17. A tracking heliostat array comprising:
a first plurality of elongate row mounts positioned at least partially between, and supported by, a first side bracket and a second side bracket, wherein the row mounts are rotatable in a first axis;
a plurality of optical elements that are mounted to one or more of the elongate row mounts;
a linkage that is mechanically coupled to a first plurality of elongate row mounts, such that movement of the linkage causes the first plurality of elongate row mounts to simultaneously rotate in the first axis;
a motor configured to move the linkage;
a collector positioned to receive solar energy reflected from at least one of the optical elements, wherein the collector is supported by a support arm that is pivotable with respect to the first and second side brackets and the collector is configured to pivot downward to a position over the plurality of optical elements where the support arm is substantially parallel to the first side bracket and second side bracket; and
a secondary motor configured to pivot the support arm with respect to the first and second side brackets.

18. A tracking heliostat array comprising:
a first plurality of elongate row mounts positioned at least partially between, and supported by, a first side bracket and a second side bracket, wherein the row mounts are rotatable in a first axis;
a plurality of optical elements that are mounted to one or more of the elongate row mounts;
a linkage that is mechanically coupled to a first plurality of elongate row mounts, such that movement of the linkage causes the first plurality of elongate row mounts to simultaneously rotate in the first axis;
a motor configured to move the linkage;
a collector positioned to receive solar energy reflected from at least one of the optical elements, wherein the collector is supported by a support arm mounted to the first and second side brackets and the collector is configured to pivot downward to a position over the plurality of optical elements where the support arm is substantially parallel to the first side bracket and second side bracket; and
a heat sink in thermal communication with the collector.

19. A concentrator apparatus comprising:
a plurality of spaced apart optical elements positionable to concentrate light;
a support frame, wherein at least one of the optical elements has an adjustable orientation with respect to the support frame;
an elongate row mount supporting a subgroup of the optical elements, wherein the subgroup of optical elements has a fixed orientation with respect to the elongate row mount;

a motor configured to rotate the elongate row mount, wherein there are fewer motors than optical elements; and a support arm that is pivotable with respect to the support frame, wherein the support arm supports a collector that is positioned to receive light reflected from the optical elements, wherein the collector and support arm are configured to Pivot downward to a position over the plurality of optical elements with the support arm substantially parallel to the first side bracket and second side bracket.

20. The concentrator apparatus of claim 19, wherein at least one of the optical elements is a mirror.

21. A method of concentrating solar radiation on a collector using a plurality of reflectors, the method comprising using a motor to move a linkage, thereby simultaneously rotating (a) a first subgroup of the plurality of reflectors around a first axis, and (b) a second subgroup of the plurality of reflectors around a second axis that is parallel to the first axis, wherein the first subgroup of reflectors is fixedly mounted to a first rotating elongate row mount and the second group of reflectors is fixedly mounted to a second rotating elongate row mount; and using a second motor to move the collector downward with respect to the plurality of reflectors to a position above the plurality of optical elements.

22. The method of claim 21, further comprising generating a control signal used to drive the motor, wherein the control signal is based on an amount of solar radiation concentrated on the collector.

23. The method of claim 21, wherein the collector is a photovoltaic cell.

24. The method of claim 21, wherein the collector has a heat sink mounted thereto.

25. The method of claim 21, wherein the collector is a Stirling engine.

26. The method of claim 21, wherein at least one of the reflectors is a planar mirror.

27. The method of claim 21, wherein at least one of the reflectors is a concave mirror.

28. The method of claim 21, wherein at least one of the reflectors includes a lens.

29. The method of claim 21, wherein moving the linkage causes the first and second elongate row mounts to rotate simultaneously.

30. A method of concentrating optical energy onto a collector, the method comprising:
rotating a first elongate row mount around a first axis using a motor, the first elongate row mount having mounted thereto a first plurality of optical elements, wherein the first plurality optical elements have a fixed orientation with respect to the first elongate row mount;
rotating a second elongate row mount around a second axis substantially parallel to the first axis using the same motor used to rotate the first elongate row mount around the first axis, the second elongate row mount having mounted thereto a second plurality of optical elements;
receiving optical energy reflected from the first and second pluralities of optical elements at a collector; and
changing a distance between the collector and the first and second elongate row mounts, wherein the collector is moved downward to a position above the plurality of optical elements.

31. The method of claim 30, further comprising storing the orientation of the first and second elongate row mounts in a computer readable memory.

32. The method of claim 30, wherein the first and second elongate row mounts are supported by, and are positioned at least partially between, a first side bracket and a second side bracket.

33. The method of claim 30, wherein the first and second elongate row mounts are supported by, and are positioned at least partially between, a first side bracket and a second side bracket, further comprising rotating the first and second side brackets with respect to a light source illuminating the first and second pluralities of optical elements.

34. The method of claim 30, further comprising measuring a quantity of optical energy received at the collector.

35. The method of claim 30, further comprising:
measuring a quantity of optical energy received at the collector; and
reorienting the first and second elongate row mounts to increase the quantity of optical energy received at the collector.

36. A concentrator system comprising:
a first plurality of optical elements tiltable with respect to an array plane via a manipulation linkage;
a second plurality of optical elements tiltable with respect to the array plane via the manipulation linkage;
a motor configured to actuate the manipulation linkage, thereby allowing the first and second pluralities of optical elements to be simultaneously reoriented;
a collector positioned to receive solar energy reflected from the first and second pluralities of optical elements; and
control circuitry configured to operate the motor to increase a quantity of solar energy received by the collector;
wherein a distance between the collector and the first and second pluralities of optical elements is adjustable
wherein the collector is configured to move downward to a position above the plurality of optical elements.

37. The concentrator system of claim 36, wherein the first and second pluralities of optical elements are supported by a wheeled chassis that is configured to be rotatable using at least one of a plurality of wheels and a motorized spindle.

38. The concentrator system of claim 36, further comprising a collector positioned to receive solar energy reflected from the first and second pluralities of optical elements.

39. The concentrator system of claim 36, further comprising a collector positioned to receive solar energy reflected from the first and second pluralities of optical elements, wherein the collector is a photovoltaic cell.

40. The concentrator system of claim 36, further comprising a computer readable memory that stores the orientation of the first and second pluralities of optical elements.

41. The concentrator system of claim 36, wherein at least one of the optical elements is a planar mirror.

* * * * *